United States Patent

Treat et al.

Patent Number: 5,731,394
Date of Patent: Mar. 24, 1998

[54] MODIFIED POLYTETRAFLUOROETHYLENE FINE POWDER

[75] Inventors: Theodore Arthur Treat, Washington; Satish Chandra Malhotra, Parkersburg, both of W. Va.

[73] Assignee: E. I. du Pont de Nemours and Company, Wilmington, Del.

[21] Appl. No.: 826,415

[22] Filed: Mar. 27, 1997

Related U.S. Application Data

[60] Provisional application No. 60/000,736, Jun. 30, 1995.

Related U.S. Application Data

[63] Continuation of Ser. No. 673,708, Jun. 25, 1996, abandoned.
[51] Int. Cl.[6] ................................. C08F 16/24
[52] U.S. Cl. ................ 526/247; 526/249; 526/206
[58] Field of Search ............................ 526/247, 249, 526/206

References Cited

U.S. PATENT DOCUMENTS

| | | |
|---|---|---|
| 3,819,594 | 6/1974 | Holmes et al. |
| 4,792,594 | 12/1988 | Gangal et al. |
| 4,837,267 | 6/1989 | Malhotra ........................ 524/535 |
| 4,904,726 | 2/1990 | Morgan et al. |

OTHER PUBLICATIONS

Polymer Technology Dictionary—Sep. 17, 1997 p. 150.

*Primary Examiner*—Joseph L. Schofer
*Assistant Examiner*—N. Sarofim

[57] ABSTRACT

Polytetrafluoroethylene (PTFE) fine powder is provided which exhibits both low rheometer extrusion pressure and high adhesion to wire by incorporating into the free powder the combination of perfluoro(alkyl) ethylene such as perfluoro(n-butyl) ethylene with fluoro(alkyl vinyl ether), such as perfluoro(propyl vinyl ether), or fluoroolefin such as hexafluoropropylene as modifiers of the PTFE fine powder. The modified PTFE fine powder is made by aqueous dispersion copolymerization of TFE with the modifying monomers, with the addition of molecular weight reducing agent towards the end of the polymerization reaction.

16 Claims, No Drawings

MODIFIED POLYTETRAFLUOROETHYLENE FINE POWDER

CROSS-REFERENCE TO RELATED APPLICATIONS

This application is a Continuation of patent application Ser. No. 08/673,708 filed Jun. 25, 1996 and abandoned, which is in turn Continuation-in-Part of provisional patent application Ser. No. 60/000,736, filed Jun. 30, 1995 by the same inventors.

FIELD OF THE INVENTION

This invention relates to fibrillatible, non-melt-fabricable polytetrafluoroethylene (PTFE) made by aqueous dispersion polymerization to obtain the fine powder type of PTFE, and more particularly to such PTFE which contains a small amount of comonomer to provide an improvement in polymer performance without changing the fundamental nature of the polymer, or in other words, to "modified" PTFE fine powder.

BACKGROUND OF THE INVENTION

PTFE free powder is prepared by polymerization of tetrafluoroethylene (TFE) in a stirred aqueous medium which contains polymerization initiator and dispersing agent, with the polymerization result being a stable aqueous dispersion of PTFE primary particles having an RDPS of 0.05 to 0.5 µm. The dispersion can be coagulated and dried, and the resultant agglomerates can be fabricated by paste (lubricated) extrusion when intermixed with usually 15 to 20 wt % of lubricant. Typically the paste extrusion will be carried out to form a cylindrical bead which encompasses a wire to form an insulated electrical conductor. It is important that after sintering, the insulation is free of flaws that could harm electrical performance. It is also desirable that a high production rate is obtainable, which means that the reduction ratio should be as high as possible at reasonably low extrusion pressures to avoid electrical flaws in the insulation. It is further desirable that after sintering, the insulation adheres to the wire sufficiently to give the insulated wire physical integrity, wherein the wire does not tend to be pulled free of the insulation.

U.S. Pat. No. 4,792,594 (Gangat and Malhotra) discloses a modified PTFE copolymer, both of the fine powder type and the granular type, wherein the modifier is 0.004 to 0.5 wt % perfluoro(n-butyl) ethylene (PFBE). The PFBE modifies the PTFE by copolymerizing with the TFE. The non-melt fabricable character of the PTFE remains unchanged, however, as indicated by the melt viscosity of the modified PTFE being above $1\times10^8$ Pa·s.

The fine powder type of modified PTFE in the '594 patent is made by continuously feeding PFBE and TFE to the copolymerization reaction, but stopping the PFBE feed at least 5%, based on monomer to polymer conversion, before the end of the polymerization. When PFBE-modified PTFE free powder is paste extruded at high reduction ratio, the extrusion pressure increases to an undesirable level to give rise to electrical flaws in the resultant wire insulation.

There is a need for PTFE fine powder which provides both high adhesion to wire and low extrusion pressure.

SUMMARY OF THE PRESENT INVENTION

This need is satisfied by the modified PTFE free powder of the present invention comprising copolymerized tetrafluoroethylene, perfluoro(alkyl) ethylene wherein the alkyl group contains from 1 to 10 carbon atoms, and fluoro(alkyl vinyl ether) (FAVE), wherein the alkyl group contains from 1 to 10 carbon atoms, or fluoroolefin of the formula CFX=CF$_2$, wherein X is Cl or R$_f$, wherein R$_f$ is perfluoroalkyl, linear or branched, containing 1 to 6 carbon atoms. The total amount of modifier present does not change the non-melt-fabricable character of the PTFE, which is characterized by the melt viscosity of the modified PTFE being greater than $1\times10^8$ Pa·s and paste extrudability. Typically the total amount of modifier will be from 0.01 to 1 wt % based on the total weight of the PTFE fine powder, and within this range, the individual modifiers are used in amounts which are effective to provide the combination of high adhesion to wire and low extrusion pressure.

The expressions "PTFE fine powder" and "modified PTFE fine powder" usually refer to the product obtained by the coagulation and drying of the polymer dispersion obtained by aqueous dispersion polymerization. As used herein, however, "modified PTFE fine powder" refers to the type of polymer obtained by the aqueous dispersion polymerization process, whether in the form of dispersed primary particles in the dispersion, coagulated agglomerates of the primary particles, or fabricated product therefrom, before and after sintering.

The modified PTFE fine powder of the present invention is made by the process comprising copolymerizing TFE with PFAE and other fluoroolefin or FAVE in water which contains a polymerization initiator and dispersing agent to make the modified fine powder as a stable aqueous dispersion of primary particles and towards the end of the copolymerization, reducing the molecular weight of the copolymer primary particles by adding molecular weight reducing agent to the copolymerization reaction. Such agent can be polymerization initiator (at greater feed rate than earlier in the reaction), chain transfer agent, or a combination thereof. The resultant copolymer is then characterized by a reduced rheometer extrusion pressure in paste extrusion as compared to the rheometer extrusion pressure that would be obtained if the molecular weight of the primary particles had not been reduced towards the end of the copolymerization reaction.

Surprisingly, the presence of the FAVE or fluoroolefin increases the adhesion of the PFAE-modified PTFE fine powder to wire.

DETAILED DESCRIPTION OF THE INVENTION

The modified PTFE fine powder of the present invention is non-melt fabricable as indicated by having a melt viscosity of greater than $1\times10^8$ Pa·s. Melt viscosity is determined in accordance with the procedure disclosed in U.S. Pat. No. 4,792,594. Thus this free powder will typically be fabricated by the well known method of paste (lubricated) extrusion, wherein the free powder is blended with a quantity of lubricant, usually within the range of 15 to 20% based on the weight of the blend, followed by the step of paste extrusion.

The perfluoro(alkyl) ethylene (PFAE) can have the formula CH$_2$=CYR'$_f$, wherein Y is H, F or CF$_3$ and R'$_f$ is a perfluoroalkyl group having 1–10 carbon atoms, provided that R'$_f$=CF$_3$ when Y=CF$_3$. Examples of PFAE include perfluoro(n-butyl) ethylene (PFBE) and hexafluoroisobutylene. The amount of PFAE modifier in the modified PTFE fine powder will generally be from 0.01 to 0.5 wt %, preferably from 0.05 to 0.15 wt %. Preferably, the PFAE is PFBE, i.e., in the formula above Y is H and R'$_f$ contains 4 carbon atoms. The amount of FAVE or fluoroolefin modifier in the modified PTFE free powder will depend on the particular comonomer used to obtain the increased adhesion to wire desired as will be described later herein, but will generally be from 0.0001 to 0.05 wt % and 0.0005 to 0.2 wt %, respectively. The total amount of comonomer in the modified fine powder will usually be less than 0.5 wt %. Wt % herein refers to the total polymer composition, wherein TFE will generally constitute at least 99 wt % of the modified PTFE fine powder, and preferably at least 99.5 wt % thereof. The fine powder can contain additional modifier provided the amount thereof does not change the non-melt-fabricable character of the free powder. Thus, for example, both FAVE and other fluoroolefin can be present.

Examples of the FAVE monomer are the fluoro(alkyl alkoxy vinyl ethers) which may contain hydrogen or chlorine, but which has at least twice as many fluorine atoms as either the hydrogen or chlorine atoms. The perfluoro(alkyl vinyl ethers) (PAVE) are preferred and, of these, PAVE containing 1 to 5 carbon atoms in the alkyl group and more preferably 1 to 3 carbon atoms are preferred. Preferred fluoroolefins include, for example, chlorotrifluoroethylene (CTFE) and hexafluoropropylene (HFP).

The modified PTFE fine powder of the present invention can be made by pressuring TFE and conventional free radical initiator into an auto clave containing water as the polymerization medium, the entire amounts of PFBE and other modifier, and dispersing agent, and paraffin wax to suppress coagulum formation. Alternatively, the other modifier, such as CTFE or perfluoroolefin or PAVE, can be added to the autoclave towards the end of the polymerization reaction. The resultant polymerization reaction mixture is agitated mildly and the polymerization is carried out at suitable temperature, e.g. 10° to 110° C. or 50° to 110° C., and pressures, e.g., 0.3 to 7 MPa. The polymerization is carried out to the desired solids content of the aqueous medium, usually within the range of 20 to 60 wt % based on the weight of the modified free powder present as primary dispersed particles having a raw dispersion particle size (RDPS, see U.S. Pat. No. 4,837,267 for measurement procedure) of 0.05 to 0.5 µm in the aqueous medium plus the weight of the aqueous medium. Preferred initiators include the inorganic persulfates such as ammonium persulfate, peroxides such as dissuccinic acid peroxide, and inorganic permanganates such as potassium permanganate, in the amount 2–1000 ppm or 2–500 ppm based on the weight of water present, and preferred dispersing agent is perfluoro-alkanoic acid and salts thereof, wherein the alkane group contains 6 to 10 carbon atoms, in the amount of 100 to 5000 ppm based on the weight of water present. Wax, if present, will be at the level of 0.1 to 12 wt % based on the weight of water present.

The aqueous dispersion polymerization reaction is modified towards the end of the reaction to reduce the molecular weight of the primary particles resulting from the polymerization. This can be accomplished by adding molecular weight reducing agent to the reaction. Molecular weight reduction can be accomplished by increasing the amount of initiator present in the polymerization reaction, i.e., adding more initiator to the reaction. Chain transfer agent may also be present in the initial phase of the polymerization reaction; the addition of more chain transfer agent will also reduce molecular weight. Otherwise, chain transfer agent can be added for the first time towards the end of the polymerization reaction. Both can be used to accomplish the molecular weight reduction.

The effect of this polymerization process is to produce primary particles of the modified PTFE fine powder dispersed in the aqueous medium, which particles have a reduced molecular weight surface or shell. This surface molecular weight reduction is characterized by the modified PTFE free powder (after coagulation and drying) exhibiting a reduced extrusion pressure. The reduced extrusion pressure can be determined by rheometer (paste extrusion device) in accordance with ASTM D 1457, Sec. 13.10 using 18.4 wt % Isopar® G lubricant and a reduction ratio of 1600:1. The rheometer extrusion pressure exhibited by the modified PTFE free powder of the present invention in which the primary particles of the fine powder having reduced molecular weight surface will be at least 20% less than the rheometer extrusion pressure for the fine powder obtained without the molecular weight reduction towards the end of the polymerization reaction, and preferably at least 40% less. Preferably, the rheometer extrusion pressure is less than 550 kg/cm$^2$.

The amount of molecular weight reduction agent will depend on the particular lower rheometer extrusion pressure desired. The molecular weight reduction step will be implemented after at least 50 wt % of the polymer has been formed, and preferably at least after 60 wt % of the polymer has been formed. The amount of molecular weight reducing agent added to accomplish at least 40% reduction in rheometer extrusion pressure and greater will depend on the molecular weight reducing agent used, i.e. the particular identity of the agent and whether it is an initiator or a chain transfer agent. The amount will also depend on when during the polymerization reaction the molecular weight reduction step is commenced. The amount of such agent is at least effective to produce the minimum rheometer extrusion pressure reduction cited above. Even with the reduced molecular weight, the modified PTFE free powder of the present invention will still have a high overall molecular weight as characterized by melt viscosity of greater than $1\times10^8$ Pa·s.

The dispersed primary particles of modified PTFE fine powder can be coagulated by conventional means, e.g. vigorous stirring, to form agglomerates of the primary particles, which can then be dried. The resultant agglomerates are soft and fibrillate upon the application of shear as is done in the paste extrusion process. Wire (solid conductor or composed of strands twisted together) is coated with the modified PTFE fine powder of the present invention by the paste extrusion process and is subsequently sintered to form insulation for the wire, which is essentially free of electrical defects.

The sintered modified PTFE fine powder of the present invention has high adhesion to the wire so as to give the insulated wire integrity. This high adhesion is the surprising contribution of the fluoro(alkyl vinyl ether) or fluoroolefin modifier to the PFAE-modified PTFE fine powder. Adhesion can be measured by the force required to strip the insulation from the wire. Procedure for measuring strip force is disclosed in the Examples. In accordance with the present invention, the amount of fluoro(alkyl vinyl ether) or fluoroolefin modifier present in the PFBE-modified fine powder is effective to produce at least a 10% greater strip force than if neither of these modifiers were present, and preferably at least 20% greater strip force. Despite this increased adhesion to the wire, the insulation nevertheless strips cleanly from the wire.

EXAMPLES

In the Examples, perfluoro(n-butyl) ethylene (PFBE) is used as the PFAE, and the PFBE content of the modified PTFE fine powder is determined by the procedure disclosed in U.S. Pat. No. 4,792,594. The perfluoro(propyl vinyl ether) and hexafluoropropylene contents in the modified free powder are determined by the procedures disclosed in U.S. Pat. No. 4,837,267.

Strip force was measured on cables produced by the following procedure: Two limes 600 g of resin were sieved and placed in individual glass bottles. Naphtha (118.6 g, 16.5 wt %) was poured into each bottle and they were tumbled in a Turbula® three axis blender for 6 minutes. Naphtha lubricant is preferred for paste extrusion of wire insulation instead of Isopar® G as required for the rheometer test. The blends were then aged at 32° C. for 24 hours prior to the preforming and extrusion. After aging and preforming to form a rod of lubricated resin, the preform rods were loaded into the barrel of the paste extruder and the barrel was closed with the master die. The paste was pushed by the ram of the extruder at a speed of 21.7–21.9mm/min through a tip (0.8×1.16 mm) and die (2.46 mm) configuration against a wire (AWG 22, outside diameter of 0.76 mm, composed of 7×0.254 mm strands which were silver plated) which is pulled continuously through the extruder and through a lubricant removal oven at 130° C. (processing 9.1 m of wire) followed by a series of 3 meter ovens with the following temperature profile: 225°, 380°, 420°, and 200° C. with a wire speed of 7.4 m/min. The finished wire was cooled to room temperature with air blowers and tested for sparkfaults. Samples were collected after 66 m.

Insulated wire (cable) samples were prepared as previously described and allowed to stabilize to room temperature. Thirty millimeters of insulation was stripped from one end of an 80 mm insulated wire sample, care being taken not to disturb the adhesion between the wire and the insulation in the remaining insulated part of the specimen. The insulation was removed so that the exposed insulation ends were square with respect to the wire. The specimen was inserted in the tensile testing machine with the stripped end in the upper clamp. The tensile testing machine was apparatus as described in ASTM D638 equipped to operate in the tensile mode with a metal plate, with a hole that was 5–10% larger than the conductor diameter. The metal plate was positioned so that the applied force on the test specimen by the tensile machine (upper clamp) provided sufficient clearance of the wire, but retained the insulation without binding. The upper clamp was tightened firmly and evenly to the degree necessary to prevent slippage of the wire from the clamp, but care was taken not to crush the wire. The crosshead speed was set at 50 mm/min and a stress-strain curve was recorded. The peak value of the force applied during the test was the strip force. The result used was an average of at least 5 samples taken after 66 m of insulated wire had been collected on the takeup roll.

Control A —No Fluoro(alkyl vinyl ether) or Fluoroolefin Modifier

A horizontally disposed, cylindrical, stainless steel autoclave, having a capacity of 36,250 ml and a length-to-diameter ratio of about 1.5:1 and provided with a 4-bladed agitator running the length of the autoclave, was charged with 18 kg of demineralized water, and 600 g of paraffin wax. At a temperature of 65° C., the autoclave was evacuated and purged with TFE three times. After the third evacuation, while the autoclave was still under vacuum, 1.1 g of ammonium perfluorooctanoate dispersing agent dissolved in 500 ml of demineralized water, 0.10 g of $ZnCl_2$, and 5.6 ml of perfluoro(n-butyl) ethylene, the entire amount of PFBE used in the polymerization reaction, was charged. With the agitator at 46 rpm, the autoclave was brought to 75° C., pressured with tetrafluoroethylene monomer to 370 psig (2.65 MPa), and 0.4 g of ammonium persulfate (APS) initiator, and 0.06 g of methanol dissolved in 250 ml of demineralized water were added at a rate of 50 ml/min. After kick-off, the pressure was maintained at 370 psig until the end of the batch. After 1.4 kg of TFE had reacted after kickoff, 55 g of ammonium perfluorooctanoate surfactant dissolved in 1000 ml of demineralized water were added at a rate of 50 ml/min. After 12.3 kg of TFE had been added to the autoclave, 1.8 g of APS and 2.4 g of methanol dissolved in 500 ml of demineralized water were added at a rate of 50 ml/min and the agitator rpm was adjusted to keep the rate of polymerization below 0.5 lb/min until the end of the batch. When a total of 15.9 kg of TFE monomer had been added to the autoclave, the feed valve was closed, the agitator was tamed off and the autoclave was vented. The total polymerization time was 90 min.

The resulting dispersion was discharged from the autoclave, cooled, and the supernatant wax was removed to yield a dispersion of 47.4% solids with a RDPS of 0.219 micrometers (primary particle size). The dispersion was diluted to 15% solids with demineralized water and after adding 1% (based on the weight of dispersion) of ammonium carbonate, was agitated vigorously until it coagulated, and after coagulation, it was agitated an additional 3 min. The coagulated product was dried at 150° C. The resin had an SSG of 2.176, and rheometer extrusion pressure of 5530 psig (38.2 MPa), and gave a strip force on cable of 8.6 Newtons (N).

Example 1

Fluoro(alkyl vinyl ether) Modifier

Control A was repeated with all ingredients and procedure identical except that 0.5 g of perfluoro(propyl vinyl) ether (PPVE) was pre-charged with the PFBE. After a polymerization time of 94 min, a dispersion of 45.0% solids with a RDPS of 0.206 micrometers was obtained. The coagulated and dried product had an SSG of 2.182, a PPVE content of 0.002 wt %, rheometer extrusion pressure of 6090 psig (48.2 MPa), and a strip force on cable of 13.5N.

Example 2

Fluoroolefin Modifier

Control A was repeated with all ingredients and procedure the same except that 3 g of hexafluoropropylene (HFP) was pre-charged with the PFBE. After a polymerization time of 88 min a dispersion of 44.3 wt % solids and an RDPS of 0.235 micrometers was obtained. The coagulated and dried product had an SSG of 2.187, an HFP content of 0.022 wt %, rheometer extrusion pressure of 5270 psig (36.4 MPa), and a strip force on cable of 17.9N.

Examples 1 and 2 show an increase in strip force of greater that 50%. When Control A was conducted without the APS initiator and methanol addition when 12.3 kg of TFE had been added to the reactor, the rheometer extrusion pressure was 9840 psig (68.0 MPa), indicating that the molecular weight reduction step reduced the rheometer pressure of the resultant modified PTFE fine powder by more than 35%.

We claim:

1. Modified polytetrafluoroethylene fine powder comprising copolymerized tetrafluoroethylene, perfluoro(alkyl) ethylene wherein the alkyl group contains from 1 to 10 carbon atoms, and fluoro(alkyl vinyl ether), wherein the alkyl group contains from 1 to 10 carbon atoms, or fluoroolefin of the formula $CFX=CF_2$, wherein X is Cl or $R_f$, wherein $R_f$ is perfluoroalkyl, linear or branched, containing 1 to 6 carbon atoms, said fine powder having a melt viscosity of greater than $1 \times 10^8$ Pa·s, said fine powder being fibrillatible and thereby paste extrudable.

2. The fine powder of claim 1, wherein said perfluoro (alkyl) ethylene has the formula $CH_2=CYR'_f$, wherein Y is H, F or $CF_3$ and $R'_f$ is a perfluoroalkyl group having 1–10 carbon atoms, provided that $R'_f=CF_3$ when $Y=CF_3$.

3. The free powder of claim 2, wherein Y is H and said $R'_f$ contains 4 carbon atoms.

4. The fine powder of claim 1 wherein said modified fine powder as wire insulation exhibits adhesion to said wire which is at least 10% greater than the adhesion of the corresponding perfluoro(alkyl) ethylene-modified polytetrafluoroethylene fine powder in the absence of said fluoro (alkyl vinyl ether) and said fluoroolefin.

5. The fine powder of claim 4 wherein the amount of said fluoro(alkyl vinyl ether) or said fluoroolefin is effective to obtain said adhesion.

6. The fine powder of claim 1 wherein the total amount of comonomer with said tetrafluoroethylene is no greater than 1 wt %.

7. The fine powder of claim 1 wherein the amount of said perfluoro(alkyl) ethylene is from 0.01 to 0.5 wt %.

8. The free powder of claim 7 wherein the amount of said fluoro(alkyl vinyl ether) or said fluoroolefin is 0.0001 to 0.05 wt % and 0.0005 to 0.2 wt %, respectively.

9. The fine powder of claim 1 made by aqueous dispersion polymerization wherein molecular weight reducing agent is added to the copolymerization reaction towards the end of the polymerization reaction, such that the rheometer pressure of the fine powder is decreased by at least 20% over the rheometer pressure if the molecular weight reducing agent had not been added.

10. The fine powder of claim 1 wherein said fine powder is composed of primary particles which have reduced molecular weight at their surface.

11. The fine powder of claim 1 wherein said fluoro(alkyl vinyl ether) is perfluoro(alkyl vinyl ether) and said alkyl group contains from 1 to 5 carbon atoms.

12. The free powder of claim 1 wherein said fluoroolefin is hexafluoropropylene or chlorotrifluoroethylene.

13. Process comprising copolymerizing tetrafluoroethylene with perfluoro(alkyl) ethylene and fluoro(alkyl vinyl ether), wherein the alkyl group contains 1 to 10 carbon atoms, or fluoroolefin of the formula $CFX=CF_2$, wherein X is Cl or $R_f$, wherein $R_f$ is perfluoroalkyl, linear or branched, containing 1 to 6 carbon atoms, in an aqueous medium containing polymerization initiator and dispersing agent to obtain modified polytetrafluoroethylene free powder having a melt viscosity of greater than $1 \times 10^8$ Pa·s, said copolymerizing being conducted by reducing the molecular weight of said free powder towards the end of the copolymerizing reaction by adding molecular weight reducing agent to said medium, the reduction in said molecular weight being characterized by the rheometer extrusion pressure of said free powder being reduced by at least 20% as compared to the rheometer extrusion pressure of said free powder if the molecular weight of said fine powder had not been reduced towards the end of said reaction.

14. The process of claim 13 wherein the addition of said molecular weight reducing agent occurs after at least 50 wt % of said fine powder has been produced.

15. The process of claim 14 wherein the amount of said fluoro(alkyl vinyl ether) or said fluoro olefin is effective to increase the adhesion of said fine powder as wire insulation to said wire by at least 10% as compared to perfluoro(alkyl) ethylene-modified polytetrafluoroethylene fine powder in the absence of said fluoro(alkyl vinyl ether) and said fluoroolefin.

16. The process of claim 13 wherein the amount of said molecular weight reducing agent is sufficient to reduce said rheometer pressure by at least 40%.

* * * * *